United States Patent
Ringland

(10) Patent No.: US 6,389,395 B1
(45) Date of Patent: *May 14, 2002

(54) SYSTEM AND METHOD FOR GENERATING A PHONETIC BASEFORM FOR A WORD AND USING THE GENERATED BASEFORM FOR SPEECH RECOGNITION

(75) Inventor: Simon P. Ringland, Ipswich (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,072
(22) PCT Filed: Nov. 1, 1995
(86) PCT No.: PCT/GB95/02563
  § 371 Date: Apr. 4, 1997
  § 102(e) Date: Apr. 4, 1997
(87) PCT Pub. No.: WO96/13827
  PCT Pub. Date: May 9, 1996

(30) Foreign Application Priority Data

Nov. 1, 1994 (EP) .......................................... 94308023

(51) Int. Cl.$^7$ ................................................ G10L 15/14
(52) U.S. Cl. ........................ 704/254; 704/242; 704/256
(58) Field of Search ................................ 704/250, 251, 704/256, 276, 241, 243, 244, 245, 270, 275, 242, 254

(56) References Cited

U.S. PATENT DOCUMENTS 4,837,831 A * 6/1989 Gillick et al. ................ 381/43

(List continued on next page.)

FOREIGN PATENT DOCUMENTS

| EP | 0453649 A2 | 10/1991 |
| EP | 0590173 A1 | 9/1992 |
| EP | 0508225 A2 | 10/1992 |
| GB | 2107102 A | 4/1983 |

OTHER PUBLICATIONS

Wilpon et al. Automatic Recognition of Keyowrd in Unconstrained Speech Using Hidden Markov Models. IEEE Transactions on Acoustics, Speech, and Signal Processing. vol. 38, No. 11, Nov. 1990.*

Rabiner. Applications of Voice Processing to Telecommunications. Proceedings of the IEEE. vol. 82, No. 2, Feb. 1994.*

(List continued on next page.)

Primary Examiner—Tālivaldis Ivars Šmits
(74) Attorney, Agent, or Firm—Nixon & Vanderhye P.C.

(57) ABSTRACT

Out-of-vocabulary word models for a speech recognizer vocabulary are generated by forming phonemic transcriptions (phonetic baseforms) of user's utterances in terms of existing reference phonemes by using a speech recognition algorithm to match input sub-word feature sample sequences to suitably-constrained allowable sequences of existing reference phoneme features. The resultant new-vocabulary-word phonetic baseform models are stored for subsequent speech recognition using the same recognition algorithm.

20 Claims, 3 Drawing Sheets

U.S. PATENT DOCUMENTS

| | | | | |
|---|---|---|---|---|
| 4,866,778 A | * | 9/1989 | Baker | 381/43 |
| 4,903,305 A | * | 2/1990 | Gillick et al. | 381/43 |
| 5,129,000 A | | 7/1992 | Tanaka | |
| 5,181,237 A | | 1/1993 | Dowden et al. | |
| 5,297,183 A | * | 3/1994 | Bareis et al. | 704/251 |
| 5,329,608 A | * | 7/1994 | Bocchieri et al. | 704/243 |
| 5,384,892 A | * | 1/1995 | Strong | 395/2.52 |
| 5,390,279 A | * | 2/1995 | Strong | 395/2.4 |
| 5,465,318 A | * | 11/1995 | Sejnoha | 704/243 |
| 5,502,790 A | * | 3/1996 | Yi | 704/256 |
| 5,638,425 A | * | 6/1997 | Meador, III et al. | 704/251 |
| 5,644,680 A | * | 7/1997 | Bielby et al. | 704/256 |
| 5,659,597 A | * | 8/1997 | Bareis et al. | 704/251 |
| 5,710,864 A | * | 1/1998 | Juang et al. | 704/251 |
| 5,717,826 A | * | 2/1998 | Setlur et al. | 704/256 |

OTHER PUBLICATIONS

Wattenbarger et al, "Serving Customers With Automatic Speech Recognition—Human–Factors Issues", AT&T Technical Journal, May/Jun. 1993,, pp. 28–41.

Levinson, "Subword–Based Large Vocabulary Speech Recognition", AT&T Technical Journal, Sep./Oct. 1993, vol. 72, No. 5, pp. 25–36.

"Opening Up Speech Processing", AT&T Technology Spring 1994, vol. 9, No. 1, pp. 14–18.

Gerard F. Chollet, et al., On the Evaluation of Speech Recognizers and Data Bases Using a Reference System, IEEE, France, 1982, pp., 2026–2029.

S. J. Cox, Hidden Markov Models for Automatic Speech Recognition: Theory and Application, British Telecommunications Journal, vol. 6, No., 2, Apr. 1988, pp. 105–115.

Frank K. Soong, et al., On the Use of Instantaneous and Transitional Spectral Information in Speaker Recognition, IEEE Transactions on Acoustics, Speech, and Signal Processing, vol. 36, No. 6, Jun. 1988, pp. 870–879.

* cited by examiner

SYSTEM AND METHOD FOR GENERATING A PHONETIC BASEFORM FOR A WORD AND USING THE GENERATED BASEFORM FOR SPEECH RECOGNITION

BACKGROUND OF THE INVENTION

1. Field of the Invention

This invention relates to speech processing and in particular to speech recognition.

2. Description of Related Art

Developers of speech recognition apparatus have the ultimate aim of producing machines with which a person can interact in a completely natural manner, without constraints. The interface between man and machine would ideally be completely seamless.

This is a vision that is getting closer to achievement but full fluency between man and machine has not yet been achieved. For fluency, an automated recogniser would require an infinite vocabulary of words and would need to be able to understand the speech of every user, irrespective of their accent, enunciation etc. Present technology and our limited understanding of how human beings understand speech make this unfeasible.

Current speech recognition apparatus includes data which relates to the limited vocabulary that the apparatus is capable of recognising. The data generally relates to statistical models or templates representing the words of the limited vocabulary. During recognition an input signal is compared with the stored data to determine the similarity between the input signal and the stored data. If a close enough match is found the input signal is generally deemed to be recognised as that model or template (or sequence of models or templates) which provides the closest match.

The templates or models are generally formed by measuring particular features of input speech. The feature measurements are usually the output of some form of spectral analysis technique, such as a filter bank analyser, a linear predictive coding analysis or a discrete transform analysis. The feature measurements of one or more training inputs corresponding to the same speech sound (i.e. a particular word, phrase etc. are typically used to create one or more reference patterns representative of the features of that sound. The reference pattern can be a template, derived from some type of averaging technique, or it can be a model that characterises the statistics of the features of the training inputs for a particular sound.

An unknown input is then compared with the reference pattern for each sound of the recognition vocabulary and a measure of similarity between the unknown input and each reference pattern is computed. This pattern classification step can include a global time alignment procedure (known as dynamic time warping DTW) which compensates for different rates of speaking. The similarity measures are then used to decide which reference pattern best matches the unknown input and hence what is deemed to be recognised.

The intended use of the speech recogniser can also determine the characteristics of the system. For instance a system that is designed to be speaker dependent only requires training inputs from a single speaker. Thus the models or templates represent the input speech of a particular speaker rather than the average speech for a number of users. Whilst such a system has a good recognition rate for the speaker from whom the training inputs were received, such a system is obviously not suitable for use by other users.

Speaker independent recognition relies on word models being formed from the speech signals of a plurality of speakers. Statistical models or templates representing all the training speech signals of each particular speech input are formed for subsequent recognition purposes. Whilst speaker independent systems perform relatively well for a large number of users, the performance of a speaker independent system is likely to be low for a user having an accent, intonation, enunciation etc. that differs significantly from the training samples.

In order to extend the acceptable vocabulary, sufficient training samples of the additional vocabulary have to be obtained. This is a time consuming operation, which may not be justified if the vocabulary is changing repeatedly.

It is known to provide speech recognition systems in which the vocabulary that a system is to be able to recognise may be extended by a service provider inputting the additional vocabulary in text form. An example of such a system is Flexword from AT&T. In such a system words are converted from text into their phonetic transcriptions according to linguistic rules. It is these transcriptions that are used in a recogniser which has acoustic models of each of the phonemes.

The number of phonemes in a language is often a matter of judgement and may depend upon the particular linguist involved. In the English language there are around 40 phonemes as shown in Table 1.

TABLE 1

| Phoneme | Transcription | Example | Phoneme | Transcription | Example |
|---|---|---|---|---|---|
| /i/ | IY | beat | /ŋ/ | G | sing |
| /I/ | IH | bit | /p/ | P | pet |
| /e'(e')/ | EY | bait | /t/ | T | ten |
| /ɛ/ | EH | bet | /k/ | K | kit |
| /æ/ | AE | bat | /b/ | B | bet |
| /a/ | AA | Bob | /d/ | D | debt |
| /A/ | AH | but | /g/ | G | get |
| /2/ | AO | bought | /h/ | HH | hat |
| /o/(o') | OW | boat | /f/ | F | fat |
| /U/ | UH | book | /θ/ | TH | thing |
| /u/ | UW | boot | /s/ | S | sat |
| /2/ | AX | about | /s/(sh) | SH | shut |
| /3'/ | ER | bird | /v/ | V | vat |
| /a"/ | AW | down | /ð/ | DH | that |
| /a'/ | AY | buy | /z/ | Z | zoo |
| /3/ | OY | boy | /_/(zh) | ZH | azure |
| /y/ | Y | you | /_/(tsh) | CH | church |
| /w/ | W | wit | /_(dzh.i) | JH | judge |
| /f/ | R | rent | /m/ | M | met |
| /l/ | L | let | /n/ | N | net |

A reference herein to phonemes or sub-words relate to any convenient building block of words, for instance phonemes, strings of phonemes, allophones etc. Any references herein to phoneme or sub-word are interchangeable and refer to this broader interpretation.

For recognition purposes, a network of the phonemically transcribed text can then be formed from stored models representing the individual phonemes. During recognition, input speech is compared to the strings of reference models representing each allowable word or phrase. The models representing the individual phonemes may be generated in a speaker independent manner, from the speech signals of a number of different speakers. Any suitable models may be used, such as Hidden Markov Models.

Such a system does not make any allowance for deviations from the standard phonemic transcriptions of words, for instance if a person has a strong accent. Thus, even though a user has spoken a word that is in the vocabulary of the system, the input speech may not be recognised as such.

It is desirable to be able to adapt a speaker independent system so that it is feasible for use by a user with a pronunciation that differs from the modelled speaker. European patent application no. 453649 describes such an apparatus in which the allowed words of the apparatus vocabulary are modelled by a concatenation of models representing sub-units of words e.g. phonemes. The "word" models i.e. the stored concatenations, are then trained to a particular user's speech by estimating new parameters for the word model from the user's speech. Thus known, predefined word models (formed from a concatenation of phoneme models) are adapted to suit a particular user.

Similarly European patent application no. 508225 describes a speech recognition apparatus in which words to be recognised are stored together with a phoneme sequence representing the word. During training a user speaks the words of the vocabulary and the parameters of the phoneme models are adapted to the user's input.

In both of these known systems, a predefined vocabulary is required in the form of concatenated sequences of phonemes. However in many cases it would be desirable for a user to add words to the vocabulary, such words being specific to that users. One known means for providing an actual user with this flexibility involves using speaker dependent technology to form new word models which are then stored in a separate lexicon. The user has to speak each word one or more times to train the system. These speaker dependent models are usually formed using DTW or similar techniques which require relatively large amounts of memory to store each user's templates. Typically, each word for each user would occupy at least 125 bytes (and possibly over 2 kilobytes). This means that with a 20 word vocabulary, between 2.5 and 40 kilobytes must be downloaded into the recogniser before recognition can start. Furthermore, a telephone network based service with just 1000 users would need between 2.5 and 20 Mbytes disc storage just for the users' templates. An example of such a service is a repertory dialler in which a user defines the people he wishes to call, so that subsequently a phone call can be placed by speaking the name of the intended recipient.

European patent application no. 590173 describes a system in which a user, who speaks a word unknown to a recognition system, can correct the word and add this word to the vocabulary of the system. The only described method for making the new word known to the recognition system is by input via a keyboard.

SUMMARY OF THE INVENTION

In accordance with the invention a method of generating vocabulary for speech recognition apparatus comprises receiving an input speech signal representing an utterance; generating from each utterance a coded representation identifying from a plurality of reference sub-word representations a sequence of reference sub-word representations which most closely resembles the utterance; and storing the generated coded representation of the utterance for subsequent recognition purposes.

Such a method allows a user to choose new words without the need to form new acoustic models of each of the words, each word or phrase being modelled as a sequence of reference sub-word representations unique to that user. This does not require any previous knowledge regarding the words to be added to the vocabulary, thus allowing a user to add any desired word or phrase.

The coded representations of the words chosen by a user are likely to bear a closer resemblance to the user's spoken speech than models formed from text. In addition, the coded representations require a memory capacity that is at least an order of magnitude less than storing the word representations as DTW models, (although this may be at a slight cost in accuracy).

Preferably, the generation of the coded representation is unconstrained by grammatical rules i.e. any sub-word representation can be followed by any other. Alternatively, a bigram grammar may be used which imposes transition probabilities between each pair of sub-words e.g. phonemes. Thus a pair of phonemes that do not usually occur in a given language (for instance P H in the English language) has a low transition probability.

Coded representations of more than one speech signal representing the same utterance may be generated. Any anomalies in the coded representation will then be accounted for. For instance, if an utterance is made over a noisy telephone line, the coded representation of the utterance may bear little resemblance to the coded representations of the same utterance over a clear telephone line. It may be appropriate to receive three training inputs of an utterance and discard a coded representations that differs significantly from the others. Alternatively all the coded representations may be retained. Whether or not all the coded representations are stored is determined by the developer of the apparatus.

In accordance with a second aspect of the invention vocabulary generation apparatus comprises deriving means for deriving feature samples from an input speech signal; a sub-word recogniser for generating from each sample of input speech signal a coded representation identifying from a plurality of reference sub-word representations a sequence of reference sub-word representations which most closely resembles the input speech signal; and a store for storing the coded representation of the input speech signal for subsequent recognition purposes.

The apparatus is intended to be associated with a speech recogniser which is configured to recognise the utterances represented by the coded representations. During recognition, the speech recogniser compares unknown input speech signals with the sequences of sub-word representations represented by the coded representations stored in the store and outputs a signal indicative of recognition or otherwise.

Preferably the grammar of the sub-word recogniser is loosely constrained. For instance, the sub-word recogniser may for example be constrained to recognise any sequence of sub-word units, bounded by line noise. Alternatively a bigram grammar may be used which imposes transition probabilities between each pair of phonemes.

The speech recognition apparatus may be configured to recognise also some pre-defined words. Preferably, the pre-defined words are also stored as coded representations of the sub-word transcriptions of the pre-defined words. The pre-defined words and the words chosen by a user are thus modelled using the same reference sub-words. The speech recogniser may be configured so as to recognise predefined words spoken in conjunction with user selected words.

Preferably the reference sub-word representations represent phonemes. Each sub-word representation may be a statistical model of a plurality of speakers' input speech containing the particular sub-word. Preferably the models are Hidden Markov models although other models may be used.

BRIEF DESCRIPTION OF THE DRAWINGS

The invention will now be described further by way of example only, with reference to the accompanying drawings in which.

DETAILED DESCRIPTION OF EXEMPLARY EMBODIMENTS

Figure 1:
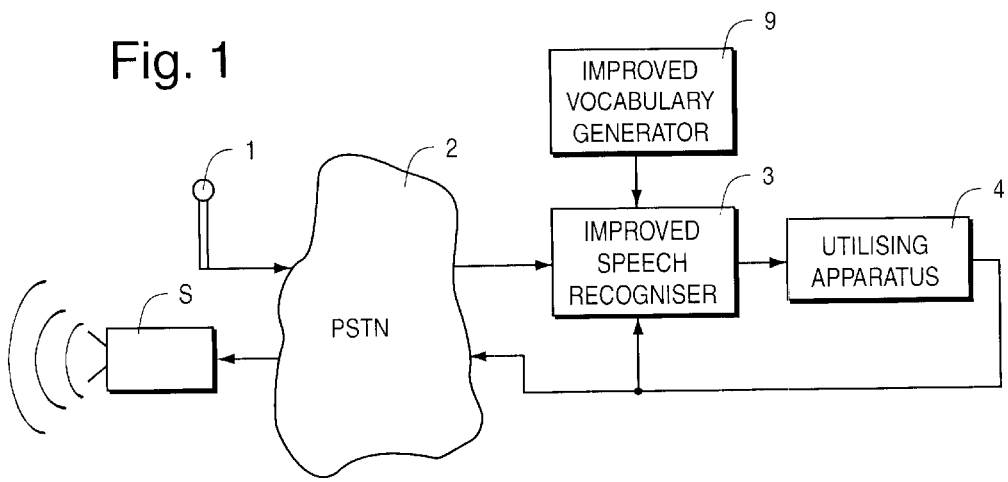
FIG. 1 shows schematically the employment of speech recognition apparatus according to the invention in a telecommunications environment.

Referring to FIG. 1, a telecommunications system including speech recognition generally comprises a microphone 1 (typically forming part of a telephone handset), a telecommunications network 2 (typically a public switched telecommunications network (PSTN)), a speech recogniser 3, connected to receive a voice signal from the network 2, and a utilising apparatus 4 connected to the speech recogniser 3 and arranged to receive therefrom a voice recognition signal, indicating recognition or otherwise of a particular word or phrase, and to take action in response thereto. For example, the utilising apparatus 4 may be a remotely operated repertory dialling system in which a user does not dial the desired number but simply speaks the name of the person to be dialled.

In many cases, the utilising apparatus 4 will generate an audible response to the user, transmitted via the network 2 to a loudspeaker 5 typically forming part of the user's handset.

In operation, a user speaks into the microphone 1 and a signal is transmitted from the microphone 1 into the network 2 to the speech recogniser 3. The speech recogniser analyses the speech signal and a signal indicating recognition or otherwise of a particular word or phrase is generated and transmitted to the utilising apparatus 4, which then takes appropriate action in the event of recognition of the speech.

When a user first uses the service provided by the utilising apparatus 4, the speech recogniser 3 needs to acquire data concerning the vocabulary against which to verify subsequent unknown speech signals. This data acquisition is performed by a vocabulary generator 9 in the training mode of operation in which the user provides training input speech samples from which the coded representations of the sub-word content of the training input speech are generated for subsequent recognition purposes.

Figure 2:
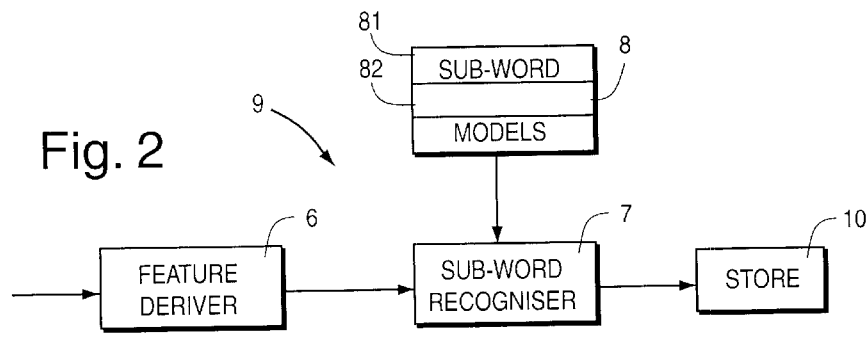
FIG. 2 is a block diagram showing schematically the functional elements of a vocabulary generator according to the invention.

In FIG. 2 the functional elements of a vocabulary generator 9 according to the invention are shown. The vocabulary generator 9 includes a feature deriver 6 for deriving feature data from an input speech signal which has been partitioned into a succession of frames of contiguous samples. The frames conventionally represent a 16 ms sample of the input speech, each sample being windowed (e.g. using a Hamming window). Examples of a suitable feature deriver are well known in the art, and may comprise some form of spectral analysis technique, such as a filter bank analyser, a linear predictive coding analysis or a discrete transform analysis.

The features may, for example, comprise cepstral coefficients (for example, LPC cepstral coefficients or mel frequency cepstral coefficients as described in "On the Evaluation of Speech Recognisers and Databases using a Reference System". Chollet & Gagnoulet. 1982 proc. IEEE p2026), or differential values of such coefficients comprising, for each coefficient, the differences between the coefficient and the corresponding coefficient value in the preceding vector, as described in "On the use of Instantaneous and Transitional Spectral Information in Speaker Recognition", Soong & Rosenberg, 1988 IEEE Trans. on Acoustics, Speech and Signal Processing Vol 36 No. 6 p871. Equally, a mixture of several types of feature coefficient may be used. The feature deriver is provided by a suitably programmed digital signal processor (DSP) device. The output data set of the feature deriver 6 forms the input to a sub-word recogniser 7.

The sub-word recogniser 7 is associated with a sub-word model store 8 having HMM models representing the 40 phonemes indicated in Table 1. The model store 8 comprises a field 81, 82, . . . , for each of the plurality of sub-words. For example, the sub-word recogniser is designed to recognise phonemes and accordingly a field is provided in the model store for each phoneme.

The sub-word recogniser 7 is arranged to read each field within the store 8 in turn, and calculate for each, using the current input feature coefficient set, the probability that the input feature set corresponds to the corresponding field. A signal indicating the most probable sub-word model is output and stored in a word store 10. Thus for a single speech signal the word store 10 stores a coded representation indicating the sequence of reference sub-word models which is deemed, by the sub-word recogniser, to most closely represent the input speech.

The calculation employs the well known HMM, as discussed in "Hidden Markov Models for Automatic Speech Recognition: Theory and Application" by S J Cox, British Telecom Technology Journal Vol 6 No. 2 April 1988. Conveniently, the HMM processing performed by the sub-word recogniser 7 uses the well known Viterbi algorithm. The sub-word recogniser 7 may, for example, be a microprocessor such as the Intel(™)i-486(™) microprocessor or the Motorola(™) 68000 microprocessor, or may alternatively be a DSP device (for example, the same DSP device as the feature extractor 6).

As described earlier the sub-word models associated with the sub-word recogniser are contained in a speaker independent manner. The coded representations generated by the sub-word recogniser 7 are therefore speaker dependent only to the extent that they represent the phonemic transcription of how a given user pronounces a word.

Figure 3:
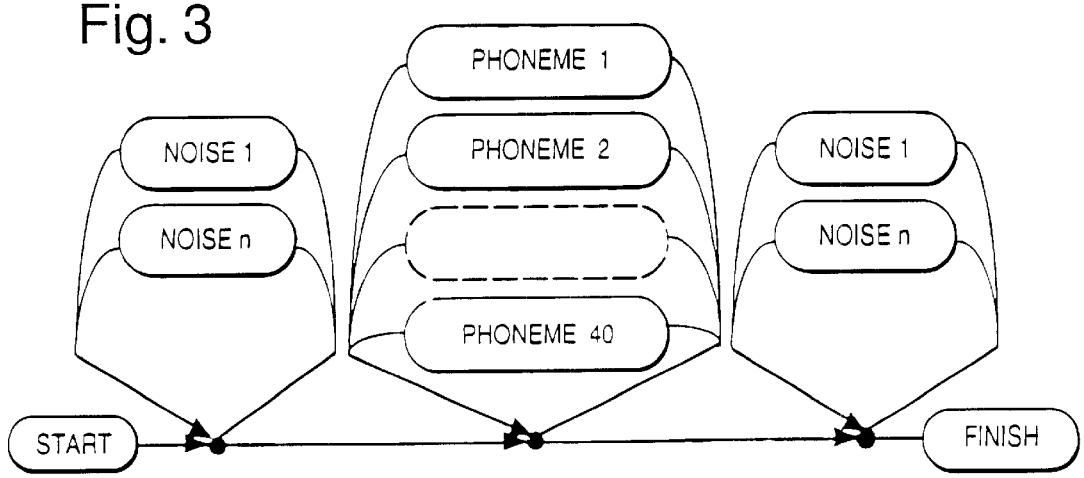
FIG. 3 shows an example of a loosely constrained network, as used in the vocabulary generator of FIG. 2.

The sub-word recogniser 7 has a recognition network that imposes little or no constraint on the possible sequence of sub-word units that may be generated. An example of a loosely constrained network is shown in FIG. 3. This network allows for the recognition of a single connected sequence of phonemes bounded by noise. The phoneme sequence is completely unconstrained and phoneme sequences that do not occur in the language of operation (in the example described this is English) may therefore be generated.

A recognition network as shown in FIG. 3 currently provides better transcription results for telephonic speech than a wholly unconstrained network i.e. one without noise models before and after the phoneme models. It does not allow phonemes followed by noise followed by phonemes. The significance of this for a practical system is that it will enhance the accuracy of the system for isolated words or connected phrases, but will have problems if the user enters a phrase with gaps between the words. For example, in a repertory dialler, if the user says "John Smith" with no gap between the forename and surname this form of grammar will not cause any problems. If, on the other hand, they do leave a gap between them the performance will suffer. However, the recognition network of the sub-word recogniser will be designed to meet the requirements of the system, e.g. isolated words, connected words etc.

On first using the service, the utilising apparatus prompts the user to provide the words the user wishes to add to the recogniser's vocabulary. In response to an audible prompt from the utilising apparatus, the user speaks a selected word into the microphone. In a repertory dialling system, this word may be the name of a person the user will wish to call e.g. "Jane".

The vocabulary generator derives features from the input, which are presented to the sub-word recogniser 7. As the input speech is received, it is matched against the models in the store 8. The sub-word recogniser 7 having a recognition network as shown in FIG. 3 generates a coded representation of the spoken input, the coded representation identifying the sequence of models which most closely resembles the input speech. Thus a phonemic transcription of the input speech is generated. The generated coded representation(s) of the training utterance is then stored in a store 10. The user is then prompted to repeat the input, so that a more robust representation of the input speech is formed.

From experiments, it was found that the accuracy achieved when only one training speech signal was provided was 87.8% whereas the accuracy when three training speech signals for the same utterance were provided rose significantly to 93.7%. Clearly a bad quality telephone line would have a significant effect on the outcome of the generation. The accuracy achieved when three training speech signals were provided was also higher than when idealised Received Pronunciation transcriptions from textual inputs were used instead of the sub-word representation. Received Pronunciation is the accent of standard Southern British English.

A further prompt is then given to the user asking if any further words are to be added. If the user responds in the affirmative, (for instance using a predefined DTMF key), the recognition process is repeated for the next word. If the user responds in the negative, the system switches to the recognition mode i.e. the speech recogniser 3 becomes operative. In the store 10 are stored coded representations identifying, for each additional vocabulary item, a sequence of reference sub-word representations.

Figure 4:
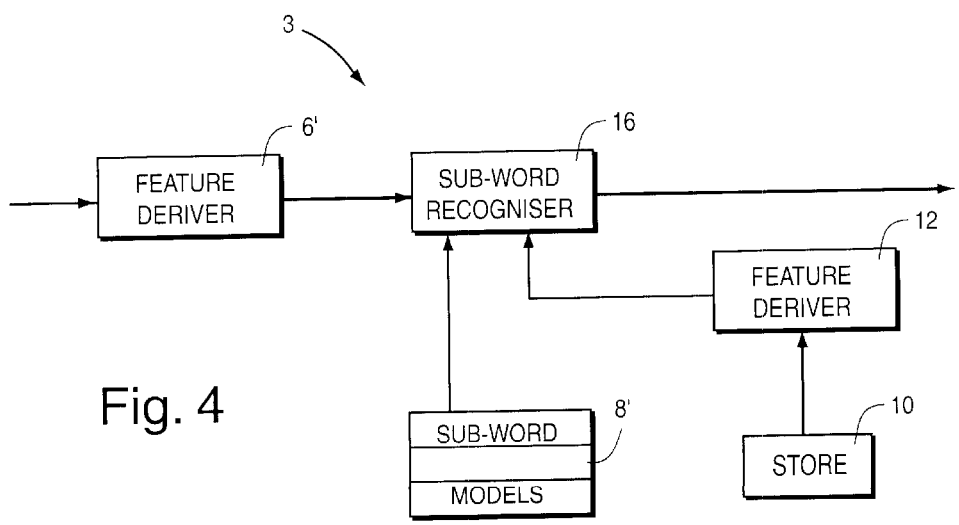
FIG. 4 shows a speech recogniser for use with the vocabulary generator shown in FIG. 2.
Figure 5:
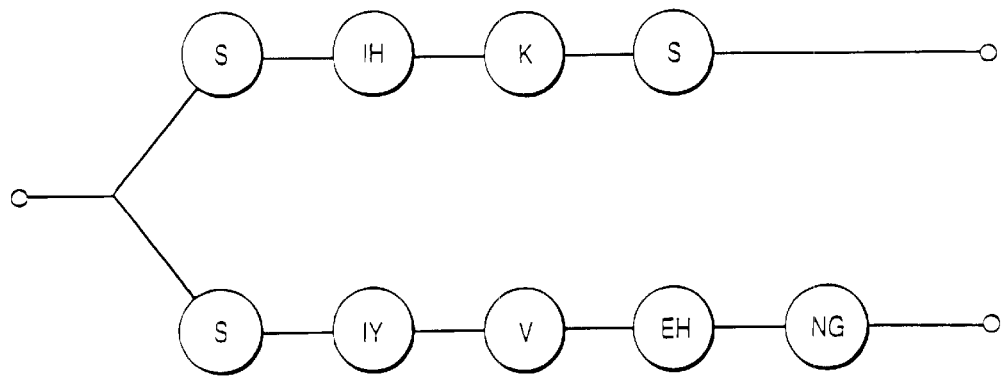
FIG. 5 shows an example of a recognition network as used with the speech recogniser of FIG. 4.
Figure 6:
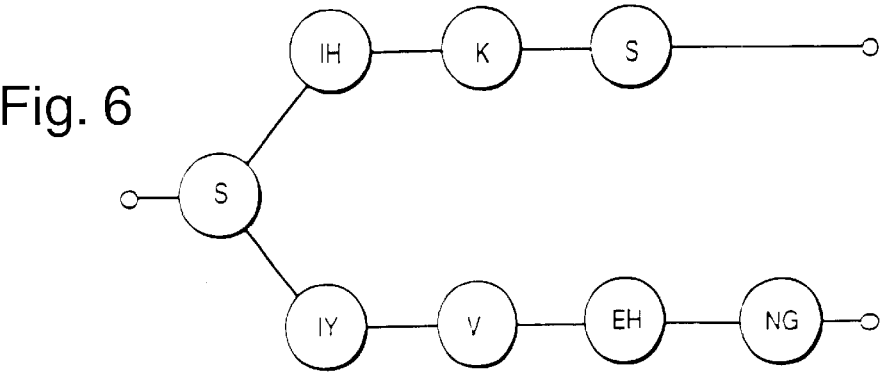
FIG. 6 shows an alternative recognition network to that shown in FIG. 5.

Once representations have been generated for each of the desired words of the vocabulary, the vocabulary can be used by the speech recogniser 3. FIG. 4 shows the elements of the speech recogniser 3. The speech recogniser 3 comprises a feature deriver 6', a sub-word model store 8' and a store 10 of coded representations generated by the vocabulary generator 9. A network generator 12 is associated with the store 10 and forms a recognition network configured by the sequences of reference sub-word representations represented by the coded representations. Such a network may be generated by for example combining the individual coded representations from the store 10 into parallel alternatives of the network, as shown in FIG. 5, or combining the coded representation into a tree structure, as shown in FIG. 6, both of which show an example of a sequence of phonemes identified in coded representations of an utterance of the words "six" and "seven".

During recognition, an input speech signal is passed to the feature deriving means 6' the features passed to a recogniser 16 which is associated with the network configured by the network generator 12. The unknown input speech is compared with the network as configured and a signal is output from the recogniser 16 if a close match is found between the unknown input speech and one of the branches of the network and hence one of the words or phrases represented by the coded representations. Once recognition has occurred, the utilising apparatus 4 takes the next appropriate step, according to the service e.g. say the service is a repertory dialling service and the recogniser 16 deems that the word "Jane" has been recognised, the utilising apparatus would dial the number associated with the name "Jane".

Figure 7:
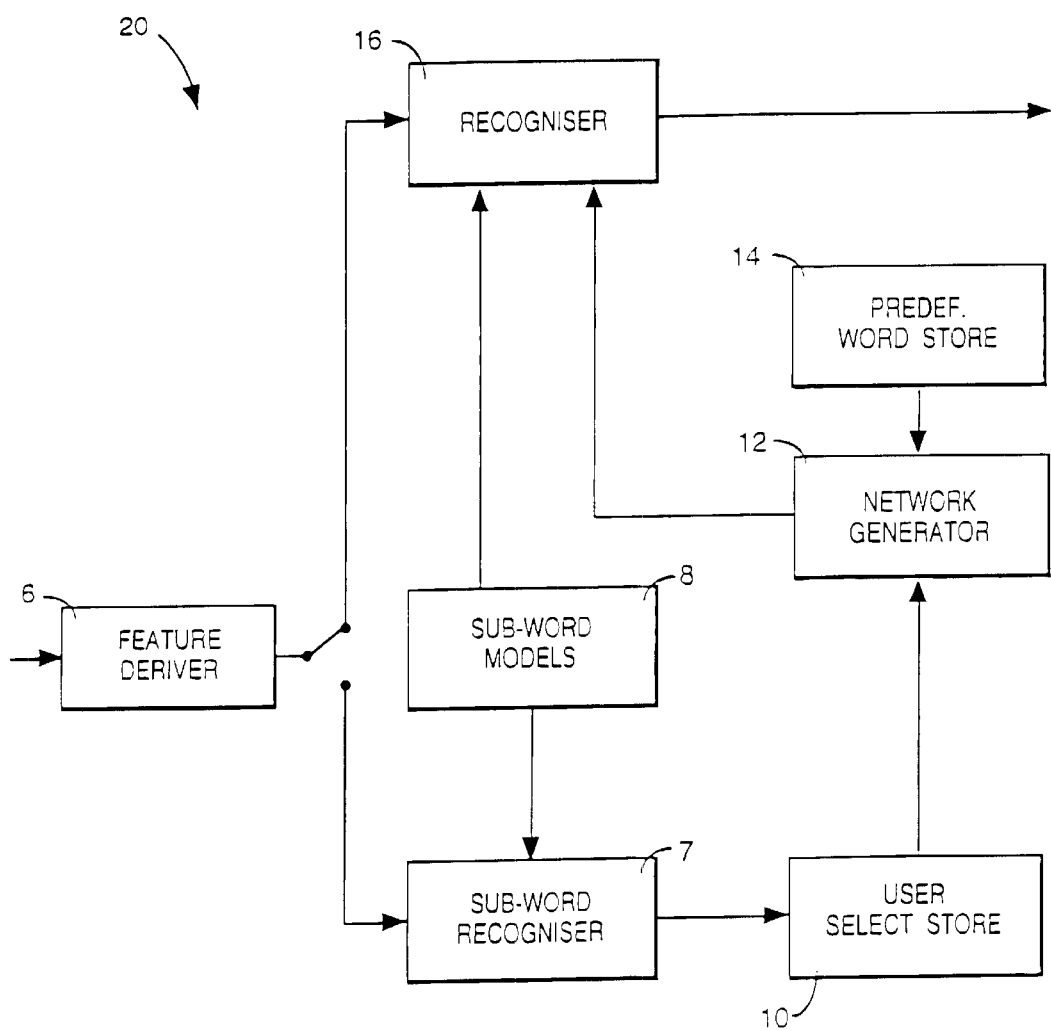
FIG. 7 shows a second embodiment of speech recognition apparatus according to the invention.

FIG. 7 illustrates a second embodiment of the invention. Whilst FIGS. 2 and 3 show the vocabulary generator 9 and the speech recogniser 3 as separate components. FIG. 7 shows them combined within speech recognition apparatus 20. The vocabulary generator 9 and the recogniser 16 share the common components i.e. the feature deriver 6, the sub-word model store 8 and the user selected word store 10. The speech recognition apparatus 20 additionally includes a pre-defined word store 14 which stores predefined coded representations of the phoneme transcriptions of pre-defined words suitable for the intended utilising apparatus. For instance, for a repertory dialling system, these pre-defined words may be the digits 0 to 9 "dial", "no", "yes", "add" etc.

The speech recognition apparatus 20 is normally in the recognition mode i.e. the input speech signal is passed to the recogniser 16. When the user wants to add a word to the system vocabulary, the user says the word "add". This signal is passed to the feature extractor 6 and the features passed to the recogniser 16. The network generator 12 generates a network consisting of all the words represented in the stores 14 and 10 (at the outset there will not be any words stored in store 10). The recogniser 16 matches the input with the network and recognises the input as the word "add" and in response enters the training mode by switching the input to the vocabulary generator 9.

The user then proceeds as in the previous embodiment by speaking the names that are to be added to the system's vocabulary. The sub-word recogniser 7 of the vocabulary generator 9 generates the coded representations for storage in the user selected store 10. However the user can respond to the prompts from the utilising apparatus in a spoken manner by saying "yes" and "no", the input speech signal being switched to the recogniser 16 when a specific response is expected.

Once the user has selected the desired words, the subsequent network generated by the network generator 12 combines predefined words from the store 14 and user selected words from the store 10. The resulting recogniser has a grammar in which some of the words are defined by phoneme sequences derived from the user's speech and some words are predefined by sequences derived from another source. The words from the two stores can be combined so that, for instance, if the word "dial" is predefined, the recognition network can be configured to combine "dial" with each of the selected words so that the system grammar allows for the connected speech "dial Jane", "dial" being predefined and "Jane" being user selected.

Speech recognition apparatus having 50% of the vocabulary pre-defined has an accuracy similar to a wholly user selected vocabulary when only one training speech signal was provided. However the accuracy of such apparatus is significantly worse than a wholly user selected vocabulary when three training utterances were provided.

Thus, in a further embodiment of the invention, the speech recogniser 20 has a number of pre-defined words in the predefined store 14 and a number of user selected words in the store 10 defined during a training mode. Sub-word representations of the pre-defined words are generated from a user's input speech during use of the apparatus by passing the features from the feature deriving means 6 to the sub-word recogniser 7 as well as to the recogniser 16. The coded representations generated by the sub-word recogniser for the utterance are added to the store 10. Subsequent speech signals corresponding to the same utterance should match the representations stored in store 10 closer than those stored in store 14, resulting in improved accuracy in recognition of the predefined words.

What is claimed is:

1. A method for generating a vocabulary for a speech recognition apparatus comprising the steps of:
  receiving an input speech signal representing a word;
  deriving feature samples from the received speech signal;
  comparing the feature samples with allowable sequences of reference sub-word representations, at least one of said sub-word representations being capable of representing a sequence of more than one feature sample;
  identifying, using an algorithm that is employed by a subsequent recognizer, the allowable sequence of reference sub-word representations that most closely resembles the received speech signal, and generating a coded representation from said identified representations; and
  storing the generated coded representation of the word for subsequent recognition of another speech signal.

2. The method of claim 1, wherein the reference sub-word models are Hidden Markov Models.

3. A method for generating a vocabulary for a speech recognition apparatus comprising the steps of:
  receiving an input speech signal representing a word;
  deriving feature samples from the received speech signal;
  comparing the feature samples with allowable sequences of reference sub-word representations, at least one of said sub-word representations being capable of representing a sequence of more than one feature sample;
  identifying, using a Viterbi algorithm, the allowable sequence of reference sub-word representations that most closely resembles the received speech signal, and generating a coded representation from said identified representations; and
  storing the generated coded representation of the word for subsequent recognition of another speech signal using a Viterbi algorithm.

4. The method according to claim 3, wherein all possible sequences of the reference sub-word representations are allowable.

5. The method according to claim 3, wherein the allowable sequences of sub-word representations are constrained to sequences that comprise sub-word representations that represent noise followed by sub-word representations that represent speech followed by sub-word representations that represent noise.

6. The method according to claim 3, wherein the step of identifying includes consideration of stored parameters each representing a transition probability of a sub-word representation following a previous sub-word representation.

7. The method according to claim 3, further comprising the step of generating a recognition network from one or more stored sub-word representations, said network representing allowable sequences of sub-word representations in the generated vocabulary.

8. The method according to claim 3, wherein the sub-word representations are statistical models.

9. The method according to claim 8, wherein the sub-word representations are Hidden Markov Models.

10. An apparatus for generating a vocabulary from an input speech signal, comprising:
  a store containing a plurality of reference sub-word representations;
  a feature deriver for receiving the input speech signal and operable to generate feature samples;
  a recognizer connected to receive the generated feature samples, the recognizer having a vocabulary of allowable sequences of sub-word representations, at least one of said sub-word representations being capable of representing a sequence of more than one feature sample;
  the recognizer being arranged in operation to employ a Viterbi algorithm to:
    compare the received feature samples with the allowable sequences of reference sub-word representations; and
    generate a coded representation by identifying an allowable sequence of reference sub-word representations that most closely resembles the input speech signal; and
  a first store for storing the coded representation of the input speech signal for subsequent recognition of another speech signal using a Viterbi algorithm.

11. The apparatus according to claim 10, further comprising: a recognizer arranged to compare input speech signals with coded representations in the first store and to output a signal indicative of recognition.

12. The apparatus according to claim 11, further comprising: a second store of coded representations of words, said coded representations having been generated in a manner different from the coded representations stored in the first store.

13. The apparatus according to claim 12, wherein the coded representations of words identify a sequence of the reference sub-word representations.

14. The apparatus according to claim 10, wherein the vocabulary defines sequences of sub-word representations that comprise sub-word representations that represent noise followed by sub-word representations that represent speech followed by sub-word representations that represent noise.

15. The apparatus according to claim 10, wherein the vocabulary defines all possible sequences of sub-word representations.

16. The apparatus according to claim 10, wherein generation of the allowable sequence of reference sub-word representations that most closely resembles the received speech signal includes consideration of stored parameters each representing a transition probability of a sub-word representation following a previous sub-word representation.

17. The apparatus according to claim 10, wherein the sub-word representations are statistical models.

18. The apparatus according to claim 17, wherein the sub-word representations are Hidden Markov Models.

19. A method for generating a vocabulary for a speech recognition apparatus comprising the steps of:

receiving an input speech signal representing a word;

deriving feature samples from the received speech signal;

comparing the feature samples with allowable sequences of reference sub-word representations, at least one of said sub-word representations being capable of representing a sequence of more than one feature sample;

identifying, using a Viterbi algorithm which imposes transitional probabilities between each pair of sub-words, the allowable sequence of reference sub-word representations that most closely resembles the received speech signal, and generating a coded representation from said identified representations; and storing the generated coded representation of the word for subsequent recognition of another speech signal using a Viterbi algorithm.

20. An apparatus for generating a vocabulary from an input speech signal, comprising:

a store containing a plurality of reference sub-word representations;

a feature deriver for receiving the input speech signal and operable to generate feature samples;

a recognizer connected to receive the generated feature samples, the recognizer having a vocabulary of allowable sequences of sub-word representations, at least one of said sub-word representations being capable of representing a sequence of more than one feature sample;

the recognizer being arranged in operation to employ a Viterbi algorithm to:

compare the received feature samples with the allowable sequences of reference sub-word representations; and generate a coded representation by identifying an allowable sequence of reference sub-word representations that most closely resembles the input speech signal, taking into account transition probabilities between pairs of sub-words; and a first store for storing the coded representation of the input speech signal for subsequent recognition of another speech signal using a Viterbi algorithm.

* * * * *